US006626289B2

(12) United States Patent
Nagata et al.

(10) Patent No.: US 6,626,289 B2
(45) Date of Patent: Sep. 30, 2003

(54) RECORDING MEDIUM ACCOMMODATING CASE

(75) Inventors: Hideo Nagata, Kyoto (JP); Noboru Wakitani, Kyoto (JP); Yasuhisa Kitano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 18 days.

(21) Appl. No.: 09/995,810

(22) Filed: Nov. 29, 2001

(65) Prior Publication Data

US 2003/0038042 A1 Feb. 27, 2003

(30) Foreign Application Priority Data

Aug. 22, 2001 (JP) ........................................ 2001-252171

(51) Int. Cl.[7] ............................................. B65D 85/57
(52) U.S. Cl. ................. 206/307.1; 206/308.1; 206/310
(58) Field of Search ...................... 206/232, 308.1, 206/307.1, 308.3, 311, 312, 313, 310

(56) References Cited

U.S. PATENT DOCUMENTS

| 5,638,952 A | * | 6/1997 | Kim | ........................ 206/307.1 |
| 5,899,327 A | * | 5/1999 | Sykes | ...................... 206/307.1 |
| 5,944,181 A | * | 8/1999 | Lau | ........................ 206/308.1 |

| 2001/0021167 A1 | * | 9/2001 | Kutaragi et al. | ......... 206/308.1 |

FOREIGN PATENT DOCUMENTS

| JP | 7-44020 | 10/1995 |
| JP | 11-59761 | 3/1999 |

* cited by examiner

Primary Examiner—Jacob K. Ackun
(74) Attorney, Agent, or Firm—Nixon & Vanderhye P.C.

(57) ABSTRACT

A recording medium accommodating case includes a main body, a lid and a joint portion. The main body is formed with a disk storage area and a cartridge storage area. On the lid, a booklet storage area is formed. The disk storage area includes a protrusion engaged in a center hole of a disk, a supporting portion which is brought into contact with a rear surface of the disk to support the disk, and a disk fall preventive portion which is formed in an outwardly projecting manner from an upper side surface of the protrusion and engaged in the center hole of the disk. The cartridge storage area includes a cartridge holding portion which comes into contact with a side surface of a cartridge to hold the cartridge, and a cartridge fall preventive portion which is formed in an inwardly projecting manner toward an inner surface of the cartridge holding portion. On the booklet storage area, a booklet holding portion having a space to store and hold a booklet in a direction of the thickness of the lid and faced to the disk storage area is formed. In addition, when the main body and the lid are closed, the booklet storage area faces the disk surface thus preventing the disk from falling.

11 Claims, 3 Drawing Sheets

(a)

(b)

(c)

(a)

(b)

(c)

RECORDING MEDIUM ACCOMMODATING CASE

FIELD OF THE INVENTION

The present invention relates to a recording medium accommodating case. More specifically, the invention relates to a novel recording medium accommodating case capable of storing a plurality of kinds of recording media such as an optical disk, e.g. a digital versatile disk (DVD), a memory cartridge or the like, and a booklet such as an instruction manual, etc.

BACKGROUND AND SUMMARY OF THE INVENTION

Japanese Patent Laying-open No. 11-59761 [B65D85/57] (Prior art 1) laid-open on Mar. 2, 1999, discloses an accommodating case capable of accommodating a plurality of kinds of recording media such as a disk, a cartridge and etc. This Prior art 1 is concerned with a disk storage case provided with an optical disk storing portion on a case main body and a floppy disk storage portion on a lid.

Additionally, Japanese Patent Laying-open No. 7-44020 [B65D85/57] (Prior art 2) laid-open on Oct. 24, 1995, discloses a disk storage case designed to prevent the disk to fall. Prior art 2 includes sandwiching protrusions on both of a case main body and a lid in such a manner as to sandwich or clamp a non-signal portion on an outer peripheral portion of the disk from both surfaces when the lid is closed.

In Prior art 1, the center hole of the optical disk is held on the case main body by forcedly inserting a holding protrusion thereinto. It has a disadvantage that a holding force for holding the optical disk decreases due to frictional wear or the like if the optical disk is frequently attached and detached. Furthermore, there was also a problem that the optical disk or the floppy disk easily falls out of the holding portion due to an impact caused when storing and carrying the case, thereby causing a surface flaw or a deformation of the disk.

In Prior art 2, the disk is clamped in a state wherein the lid is closed, and therefore, there was a possibility that the disk would fall out of the case and be damaged. This damage may be caused by carelessness when the disk is retrieved by opening the lid or when the disk is stored. Furthermore, the clamping protrusion formed on the lid is not made to serve the multiple purpose of storing a booklet such as an instruction manual. In the case where a booklet storage portion is to be separately formed, there is a problem that the number of parts or items increases, hence resulting in increased cost.

Therefore, it is a feature of an exemplary embodiment of the present invention to provide a novel recording medium accommodating case.

It is another feature of an exemplary embodiment of the present invention to provide a recording medium accommodating case capable of preventing a recording medium from falling out of a holding portion, and serving the multiple purposes of preventing the recording medium from falling and holding a booklet.

It is still another feature of an exemplary embodiment of the present invention to provide a recording medium accommodating case capable of preventing deterioration of the holding force of the recording medium.

A recording medium accommodating case according to an exemplary embodiment comprises a main body formed with a disk storage area capable of storing a disk having thereon a center hole and a cartridge storage area capable of storing a cartridge; a lid having a booklet storage area capable of storing a booklet; and a joint portion which joins the main body and the lid to each other, wherein the main body and the lid are freely opened and closed in a state where both are facing each other.

The disk storage area includes a protrusion, a supporting portion and a disk fall preventive portion. The protrusion is engaged in the center hole of the disk. The supporting portion comes into contact with one main surface of the disk to support the disk. The disk fall preventive portion is formed in an outwardly projecting manner from an upper side surface of the protrusion, and engaged in the center hole of the disk.

The cartridge storage area includes a cartridge holding portion and a cartridge fall preventive portion. The cartridge holding portion is brought into contact to a side surface of the cartridge to hold the cartridge. The cartridge fall preventive portion is formed in such a manner as to be projected toward an inner peripheral surface of the cartridge holding portion.

A booklet holding portion is formed on the booklet storage area. The booklet holding portion has a space for storing and holding the booklet in a direction of a thickness of the lid, facing the disk storage area.

Furthermore, when the main body and the lid are closed, the booklet holding portion faces the other main surface of the disk thus preventing the disk from falling.

The aforementioned protrusion includes a first protrusion formed in a fixed manner and a second protrusion formed in an elastically deformable manner, and the disk fall preventive portion is formed on an upper side surface of the second protrusion.

Furthermore, the booklet holding portion is constituted in such a manner as to have a ribbon-shaped portion facing a portion of the disk storage area when the main body and the lid are closed.

In a preferred embodiment, the booklet holding portion is made to be detachable against the booklet storage area, and includes a ribbon-shaped portion having engaging claws formed at both end portions thereof, and being deformable in a width direction of the booklet storage area. In the booklet storage area, engaging holes engaged with the engaging claws are formed. In addition, by making the engaging claws of the ribbon-shaped portion and the engaging holes to be engaged with each other, the booklet holding portion is attached to the booklet storage area.

Furthermore, the supporting portion is constituted by a ring-shaped first supporting portion having a diameter bigger than that of the center hole of the disk and smaller than that of an outer periphery of the disk, and a second supporting portion brought into contact to at least a portion of the outer periphery of the disk.

In addition, the second supporting portion is formed with a first supporting wall abutting on a portion of an outer peripheral side surface of the disk, and a second supporting wall lower in height than the first supporting wall and abutting on an outer peripheral edge of one main surface of the disk.

According to an exemplary embodiment, it is possible to prevent a recording medium from falling out of the holding portion when holding the recording medium such as a disk, thus making it possible to obtain a recording medium accommodating case capable of serving the multiple purposes of preventing a recording medium from falling and holding a booklet.

In addition, according to a preferred embodiment, the recording medium is not subjected to pressure, thus preventing deterioration of the holding force of the recording medium.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plain view showing a recording medium accommodating case of one embodiment according to the present invention, wherein FIG. 1(a) is a plain view of an entire recording medium accommodating case, FIG. 1(b) is an enlarged plain view of a center portion of a disk storage area, and FIG. 1(c) is an enlarged plain view of a cartridge storage area;

FIG. 2 is a perspective view showing the recording medium accommodating case of one embodiment according to the present invention, wherein FIG. 2(a) is a perspective view showing a stored state while a lid is opened, and FIG. 2(b) is a perspective view showing a state when the lid is closed; and FIG. 3 is a sectional view showing a state that a disk is stored in the recording medium accommodating case of one embodiment according to the present invention, wherein FIG. 3(a) is a sectional view showing a cross section at line A—A in FIG. 1(a), FIG. 3(b) is an enlarged sectional view of a main body side in FIG. 3(a), and FIG. 3(c) is an enlarged sectional view showing a state when the lid is closed.

DETAILED DESCRIPTION OF THE PREFERRED EMBODIMENTS

Figure 1:
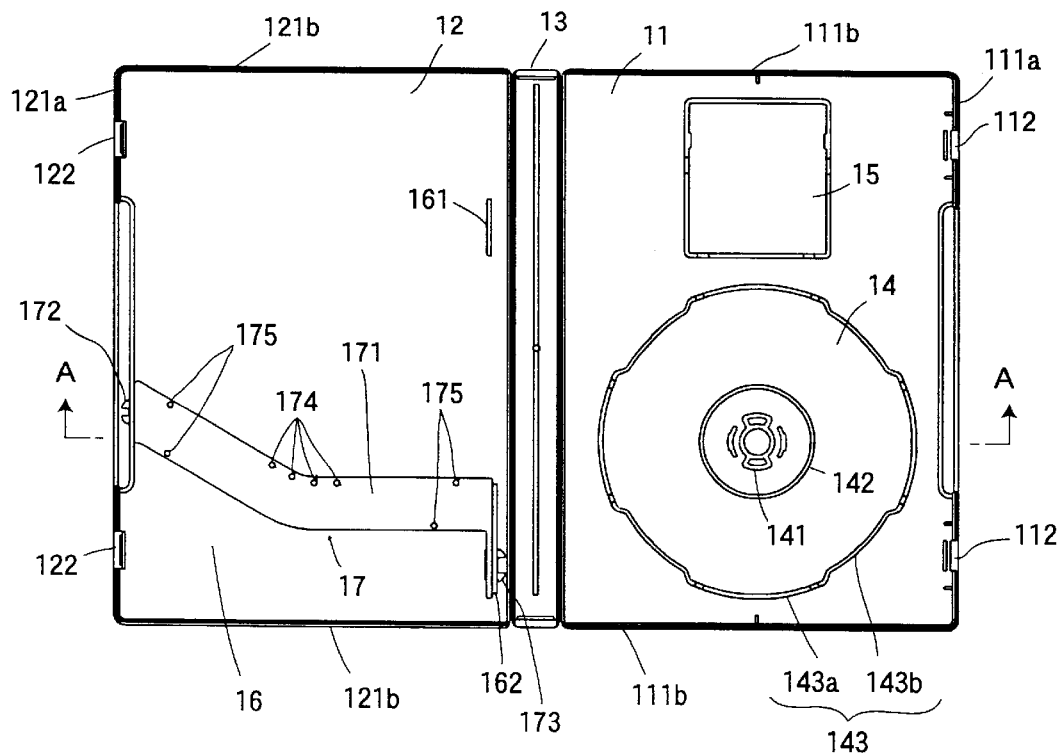
Figure 1:
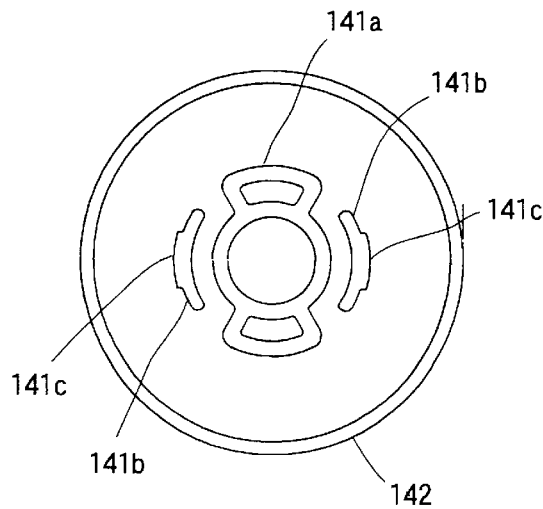
Figure 1:
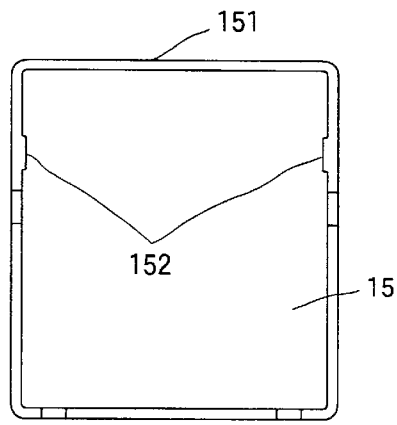
Figure 2:
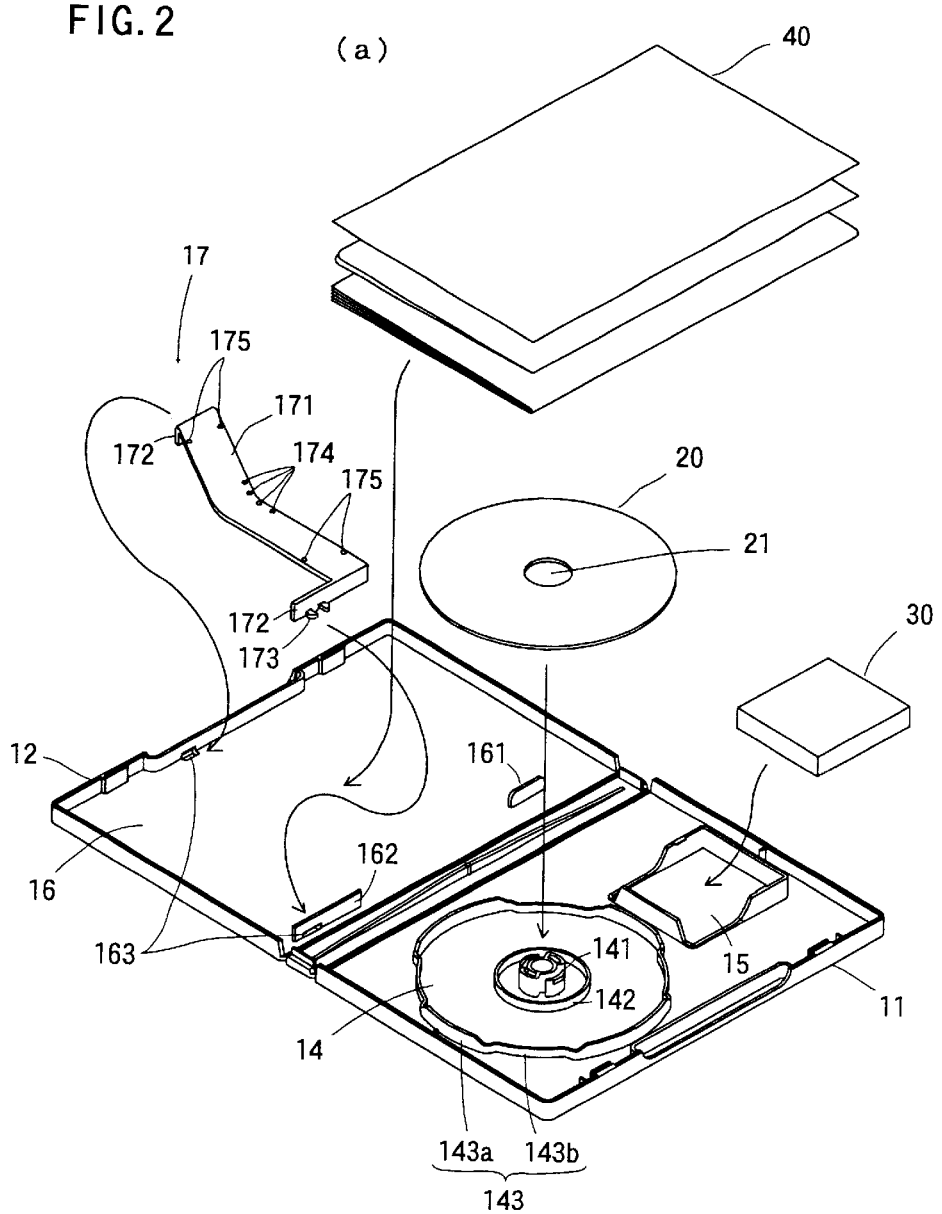
Figure 2:
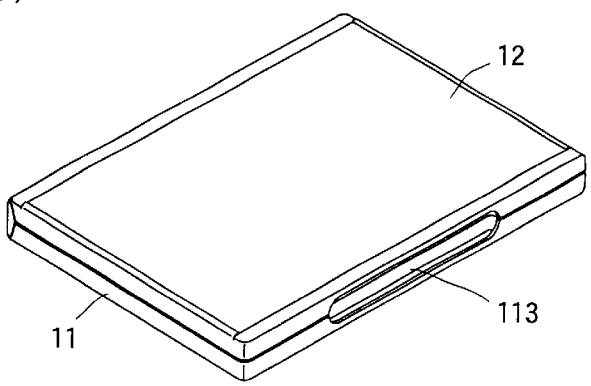
Figure 3:
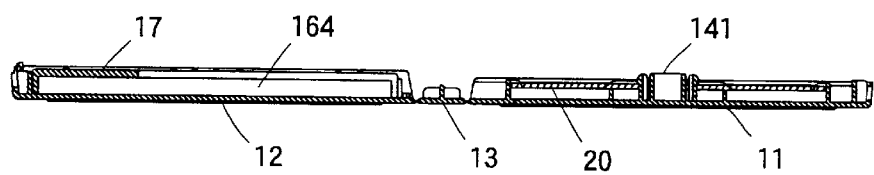
Figure 3:
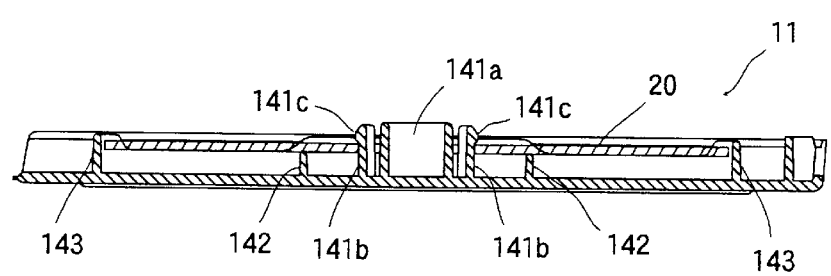
Figure 3:
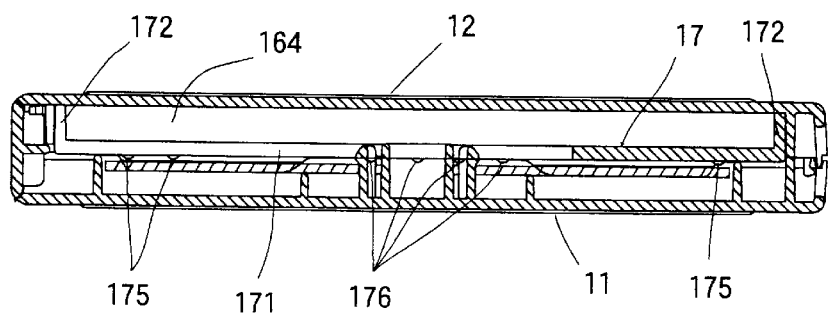

Referring to FIG. 1 to FIG. 3, a recording medium accommodating case 10 includes a main body 11, a lid 12 and a joint portion 13. The main body 11, the lid 12 and the joint portion 13 are integrally formed by injection molding of a resin material. The recording medium accommodating case 10 opens and closes the lid by rotating the main body 11 and the lid 12 in such a manner so as to be facing each other while the joint portion 13 is disposed at a center portion.

The main body 11 is formed with a side wall 111a on a side opposite to a side adjacent to the joint portion 13, and side walls 111b on two sides adjacent to the side wall 111a. At upper and lower areas of the side wall 111a, a pair of engaging claws are formed. Likewise, the lid 12 is formed with a side wall 121a on a side opposite to a side adjacent to the joint portion 13. Side walls 121b on two sides are adjacent to the side wall 121a. At upper and lower areas of the side wall 121a a pair of engaging protrusions are formed at positions respectively corresponding to the engaging claws 112. When the lid is closed in such a manner that the main body 11 and the lid 12 are faced to each other, the engaging claws 112 and the engaging protrusions 122 are engaged to each other so that a closed-lid state is established. Furthermore, a concave portion 113 is formed on a side surface to which side the lid is opened (a side surface constituted by the side wall 111a and the side wall 121a) so that a user can easily open the lid with both thumbs (see FIG. 2(b)).

On the main body 11, within an internal area surrounded by the side walls 111a and 111b, a disk storage area 14 and a cartridge storage area 15 are formed in such a manner as not to be overlapped to each other within the same plane. In the disk storage area 14 an optical disk such as a compact disk (CD), a DVD or the like, for example, is stored. In the cartridge storage area 15 a memory card, a cartridge or the like is stored.

The disk storage area 14 includes a protrusion 141, a first supporting portion 142 and a second supporting portion 143. The protrusion 141 is formed of a plurality of circular-arc-shaped portions to hold the disk 20 by engaging with a center hole 21 of the disk 20. The protrusion 141 is constituted in such a manner as to form the circular-arc-shaped portions which inscribe the center hole 21 with a combination of a first protrusion 141a and a pair of second protrusions 141b. More specifically, the first protrusion 141a is formed in a shape of a cylindrical post having circular-arc-shaped portions at upper and lower sides as seen from the plan view, and the first protrusion 141a is constituted in a fixed manner thus virtually impossible to deform elastically. The second protrusions 141b are formed at predetermined spaces from both side ends of the first protrusion 141a and stand upright at positions on a line crossing at right angle to the protrusion 141a to form a circular-arc-shape, and are thus constituted in an elastically deformable manner. The second protrusions 141b are formed with disk fall preventive portions 141c in an outwardly projecting manner such that the second protrusions 141b become deformed in attaching the disk 20 thus becoming smaller than an internal diameter of the center hole 21, and operate to prevent the disk 20 from falling by engaging in the center hole 21 after the disk 20 is attached (see FIG. 3(b)). That is, the disk fall preventive portions 141c are formed as protrusions having circular-arc-shape as if to project outwardly from side surfaces of upper portions of the second protrusions.

The protrusion 141 is formed in such a manner that a width of a portion (a diameter in a vertical direction in FIG. 3(b)) excluding the disk fall preventive portions 141c is somewhat smaller than that of the center hole 21, and a width including the disk fall preventive portions 141c (a diameter of an upper surface in a horizontal direction in FIG. 3(b)) is somewhat bigger than that of the center hole 21 so that it is possible to loosely engage in the center hole 21 of the disk 20. Due to this, the protrusion 141 does not press the center hole 21 and the disk fall preventive portions 141c effectively prevent the disk from falling out of the protrusion 141 even if the center hole 21 of the disk 20 is engaged with the protrusion 141. Therefore, the disk 20 will not fall out of the disk storage area 14 even if the case 10 falls due to carelessness. Furthermore, in comparison with a case where the disk is held by crimping the center hole of the disk, it is possible to eliminate a disadvantage of deterioration of a holding force due to a frictional wear as a result of frequent attaching and detaching of a disk. The second protrusions 141b are elastically deformed in such a manner as to be slant toward an inner side (direction to the center) when the disk 20 is attached or detached thus making it easy to attach or detach the disk 20.

The first supporting portion 142 is formed of a ring-shaped projection having a diameter bigger than that of the center hole 21 of the disk 20 and smaller than that of the outer periphery of the disk 20. The second supporting portion 143 is constituted in such a manner as to come into contact with at least a portion of the outer peripheral portion of the disk 20, and includes a first supporting wall 143a and a second supporting wall 143b. The first supporting wall 143a is formed in such a manner as to be brought into contact with a portion of an outer peripheral side surface of the disk 20. The second supporting wall 143b is formed in such a manner as to be lower in height than the first supporting wall 143a and comes into contact with an outer peripheral edge of a rear surface (one main surface) of the disk. The first supporting wall 143a is formed outside from the second supporting wall 143b, and the second supporting wall 143b is formed at a same height as the first holding portion 142. Due to this, when the disk 20 is stored in the disk storage area 14, an outer peripheral side surface of the disk 20 is exposed at a portion corresponding to the second supporting wall 143b. Therefore, it is easy to retrieve the disk 20 from the disk storage area 14 when retrieving the disk 20, by gripping the outer peripheral side surface of the disk 20 at positions corresponding to the second supporting wall 143b to raise the disk.

The cartridge storage area 15 is constituted of a cartridge holding portion 151 and a cartridge fall preventive portion 152. The cartridge holding portion 151 is formed of a rectangular-shaped wall surface approximately the same size as a cartridge 30 so as to hold the cartridge 30 by bringing the wall surface into contact with a side surface of the cartridge 30. The cartridge holding portion 151 is formed in such a manner that its lower portions of right and left side surfaces are lower in height than other portions. Therefore, when the cartridge 30 is stored in the cartridge storage area 15, a portion of the lower right and left side surfaces of the cartridge 30 is exposed. By gripping the lower right and left side surface of the cartridge 30 to raise the cartridge 30, it is easy for a user to retrieve the cartridge 30 from the cartridge storage area 15.

The cartridge fall preventive portion 152 is formed in an outwardly projecting manner toward an inner surface of the cartridge holding portion 151. More specifically, the cartridge fall preventive portion 152 is formed in an inwardly projecting manner from upper right and left portions of the wall surface of the cartridge holding portion 151 so that an upper surface of the cartridge 30 is held when the cartridge 30 is stored in the cartridge storage area 15. Therefore, when the cartridge 30 is stored in the cartridge storage portion 15, the cartridge fall preventive portion 152 holds the upper surface of the cartridge 30 thus making it possible to prevent the cartridge 30 from falling due to an impact, such as the case falling.

In the lid 12 a booklet storage area 16 is provided in an internal area surrounded by side walls 121a and 121b. On the booklet storage area 16, a wall surface 161 and a wall surface 162 are formed. An engaging hole 163 is formed on wall surface 162 and wall surface 121a. Furthermore, a detachable booklet holding portion 17 is formed on the booklet storage area 16. The booklet holding portion 17 is constituted of a ribbon-shaped portion 171 having an approximately "V" letter shape and deformable elastically to a right and left direction (a width direction of the booklet storage area 16), wall surfaces 172 extending downwardly from right and left side surfaces of the ribbon-shaped portion 171, and engaging claws 173 formed at a lower end portion of the wall surfaces 172. The detachable booklet holding portion 17 is attached to the booklet storage area 16 by engaging the engaging claws 173 with the engaging holes 163 formed on the wall surface 162 and the wall surface 121a of the booklet storage area 16. On the booklet storage area 16, a storing concave portion 164 (a space to store and hold the booklet) is formed by a thickness in the direction of the lid 12 by the ribbon-shaped portion 171 of the booklet holding portion 17 and the wall surfaces 172 (see FIGS. 3(a), (c)). That is, the booklet storage area 16 can store and hold a booklet 40 by inserting the booklet 40 such as an instruction manual or the like, into the storing concave portion 164.

When the booklet holding portion 17 is attached into the booklet storage area 16, and the main body 11 and the lid 12 are closed, the ribbon-shaped portion 171 faces the disk storage area 14, that is, a portion of a surface (the other main surface) of the disk 20 thus preventing the disk 20 from falling. More specifically, on the booklet holding portion 17 a first projection 174 and a second projection 175 are formed on a surface of the ribbon-shaped portion 171. The first projection 174 is formed of four hemispheric projections provided at a center of the ribbon-shaped portion 171, and faced to a center surface portion of the disk 20 thus preventing the disk 20 from falling when the main body 11 and the lid 12 are closed. The second projection 175 is formed of two hemispheric projections on each right and left area of the ribbon-shaped portion 171, and faced to an outer peripheral surface edge of the disk 20 when the main body 11 and the lid 12 are closed thus preventing the disk 20 from falling (see FIG. 1(a), FIG. 3(c)). Therefore, in a state wherein the main body 11 and the lid 12 are closed, the booklet holding portion 17 holds a surface of the disk 20 both at the center portion and an outer peripheral edge thus making it possible to securely hold the disk 20 at a predetermined position, and in addition, effectively prevent the disk 20 from falling due to an impact such as a drop. Furthermore, in comparison with a case where a booklet storing/holding and a disk fall prevention are separately formed, the booklet holding portion 17 can serve a double purpose to store/hold a booklet and prevent a disk from falling so that it is possible to make an effective use of a space, and to reduce a cost with the reduced number of parts or items.

In the above embodiment, although a description is made with regard to a case that the detachable booklet holding portion 17 is attached into the booklet storage area 16, it may be also possible to integrally form the booklet holding 17 and the booklet storage area 16.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording medium accommodating case, comprising:
a main body having a disk storage area capable of storing a disk having a center hole and a cartridge storing area portion capable of storing a cartridge;
a lid having a booklet storage area capable of storing a booklet; and
a joint portion joining the main body and the lid, wherein the main body and the lid are operable to open and close in a state where both are facing each other,
said disk storage area includes a protrusion engageable to the center hole of said disk, a supporting portion brought into contact to one main surface of said disk to support said disk, and a disk fall preventive portion formed in an outwardly projecting manner from an upper side surface of said protrusion and engageable to the center hole of said disk, said protrusion including a first protrusion formed in a fixed manner and a second protrusion formed in an elastically deformable manner so as to be movable between an unflexed position and a position flexed in a substantially radial sense towards the first protrusion when attaching and detaching the disk, said disk fall preventive portion being formed at an upper side surface of said second protrusion, said cartridge storing area portion includes a cartridge holding portion for holding a cartridge by abutting on a side surface of said cartridge and a cartridge fall preventive portion formed in an inwardly protruding manner toward an inner surface of said cartridge holding portion, said booklet storage area having a space to hold said booklet and a booklet holding portion facing said disk storage area is formed thereon, and when said main body and said lid are closed, said booklet holding portion faces the other main surface of said disk to thereby aid in preventing said disk from falling.

2. A recording medium accommodating case according to claim 1, wherein said booklet holding portion is formed in such a manner as to have a ribbon-shaped portion which faces a portion of said disk storage area when said main body and said lid are closed.

3. A recording medium accommodating case according to claim 1, wherein said booklet holding portion is detachably attached to said booklet storage area, and includes a ribbon-shaped portion having an engaging claw formed at an end portion thereof and which is deformable in a direction of the width of said booklet storage area, said booklet storage area is formed with an engaging hole engaged with said engaging claw, whereby the engaging claw of said ribbon-shaped portion engages the engaging hole, such that said booklet holding portion is attached to said booklet storage area.

4. A recording medium accommodating case according to claim 1, wherein said supporting portion includes a ring-shaped first supporting portion having a diameter bigger than that of the center hole of said disk and smaller than that of an outer peripheral diameter of said disk, and a second supporting portion adjacent to at least a part of the outer peripheral portion of said disk.

5. A recording medium accommodating case according to claim 4, wherein said second supporting portion is formed of a first supporting wall brought into contact with a portion of the outer peripheral side surface of said disk, and a second supporting wall lower in height than the first supporting wall and brought into contact with an outer peripheral edge of one main surface of said disk.

6. A recording medium accommodating case, comprising:

a main body having a disk storage area capable of storing a disk having a center hole and a cartridge storing area portion capable of storing a cartridge;

a lid having a booklet storage area capable of storing a booklet; and a joint portion joining the main body and the lid, wherein the main body and the lid are operable to open and close in a state where both are facing each other, said disk storage area includes a protrusion engageable to the center hole of said disk, a supporting portion brought into contact to one main surface of said disk to support said disk, and a disk fall preventive portion formed in an outwardly projecting manner from an upper side surface of said protrusion and engageable to the center hole of said disk, said cartridge storing area portion includes a cartridge holding portion for holding a cartridge by abutting on a side surface of said cartridge and a cartridge fall preventive portion formed in an inwardly protruding manner toward an inner surface of said cartridge holding portion, said booklet storage area having a space to hold said booklet and a booklet holding portion facing said disk storage area is formed thereon, when said main body and said lid are closed, said booklet holding portion faces the other main surface of said disk to thereby aid in preventing said disk from falling, said booklet holding portion is detachably attached to said booklet storage area, and includes a ribbon-shaped portion having an engaging claw formed at an end portion thereof and which is deformable in a direction of the width of said booklet storage area, and said booklet storage area is formed with an engaging hole engaged with said engaging claw, whereby the engaging claw of said ribbon-shaped portion engages the engaging hole, such that said booklet holding portion is attached to said booklet storage area.

7. A recording medium accommodating case, comprising:

a main body having a disk storage area capable of storing a disk having a center hole;

a lid; and a joint portion joining the main body and the lid, wherein the main body and the lid are operable to open and close in a state where both are facing each other, and said disk storage area includes a protrusion engageable to the center hole of said disk, a supporting portion brought into contact to one main surface of said disk to support said disk, and a disk fall preventive portion formed in an outwardly projecting manner from an upper side surface of said protrusion and engageable to the center hole of said disk, said protrusion including a first protrusion formed in a fixed manner and a second protrusion formed in an elastically deformable manner so as to be movable between an unflexed position and a position flexed in a substantially radial sense towards the first protrusion when attaching and detaching the disk, said disk fall preventive portion being formed at an upper side surface of said second protrusion.

8. A recording medium accommodating case according to claim 7, further comprising a booklet holding portion formed in such a manner as to have a ribbon-shaped portion which faces a portion of said disk storage area when said main body and said lid are closed.

9. A recording medium accommodating case according to claim 7, further comprising a booklet holding portion detachably attached to a booklet storage area, said booklet holding portion including a ribbon-shaped portion having an engaging claw formed at an end portion thereof which is deformable in a direction of the width of said booklet storage area, said booklet storage area being formed with an engaging hole engaged with said engaging claw, whereby the engaging claw of said ribbon-shaped portion engages the engaging hole, such that said booklet holding portion is attached to said booklet storage area.

10. A recording medium accommodating case according to claim 7, wherein said supporting portion includes a ring-shaped first supporting portion having a diameter bigger than that of the center hole of said disk and smaller than that of an outer peripheral diameter of said disk, and a second supporting portion adjacent to at least a part of the outer peripheral portion of said disk.

11. A recording medium accommodating case according to claim 10, wherein said second supporting portion is formed of a first supporting wall brought into contact with a portion of the outer peripheral side surface of said disk, and a second supporting wall lower in height than the first supporting wall and brought into contact with an outer peripheral edge of one main surface of said disk.

* * * * *